G. A. BOYDEN, Jr.
COMBINED ENGINE AND PUMP.
APPLICATION FILED FEB. 5, 1916.
1,250,423.
Patented Dec. 18, 1917.
4 SHEETS—SHEET 1.
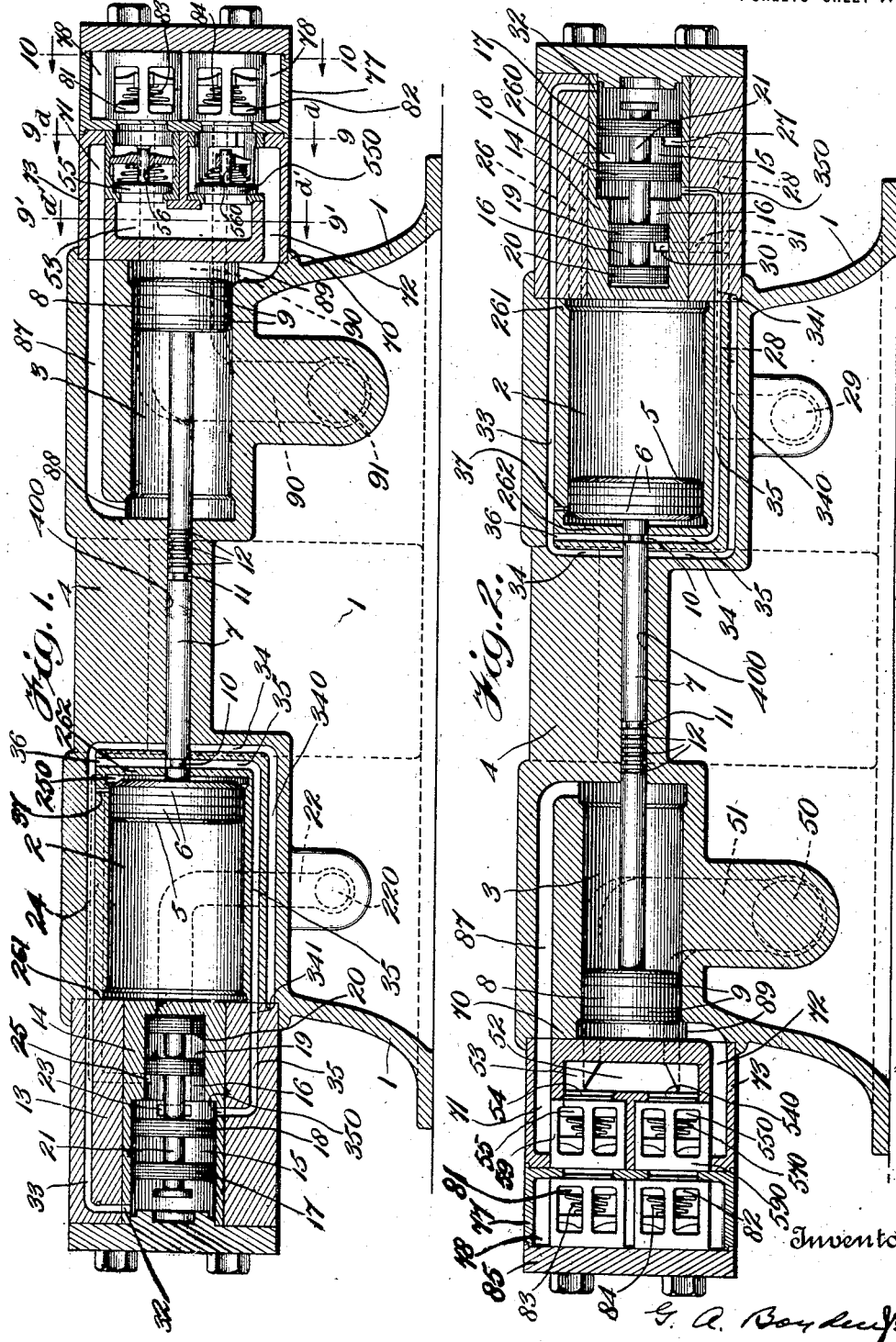
Inventor
G. A. Boyden Jr.
Attorney G. A. BOYDEN, Jr.
COMBINED ENGINE AND PUMP.
APPLICATION FILED FEB. 5, 1916.
1,250,423.
Patented Dec. 18, 1917.
4 SHEETS—SHEET 2.
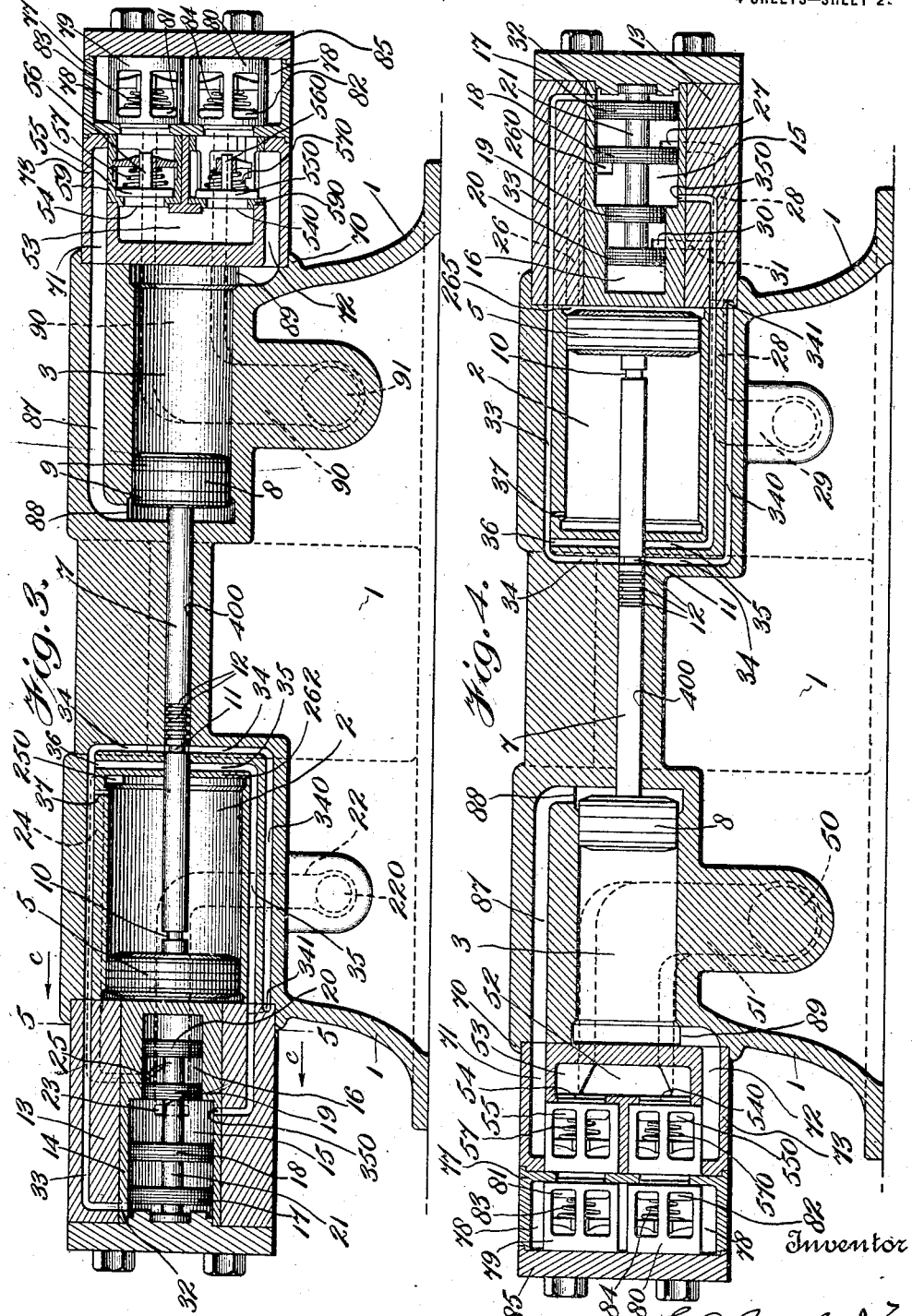
Inventor
G. A. Boyden Jr.
Attorney

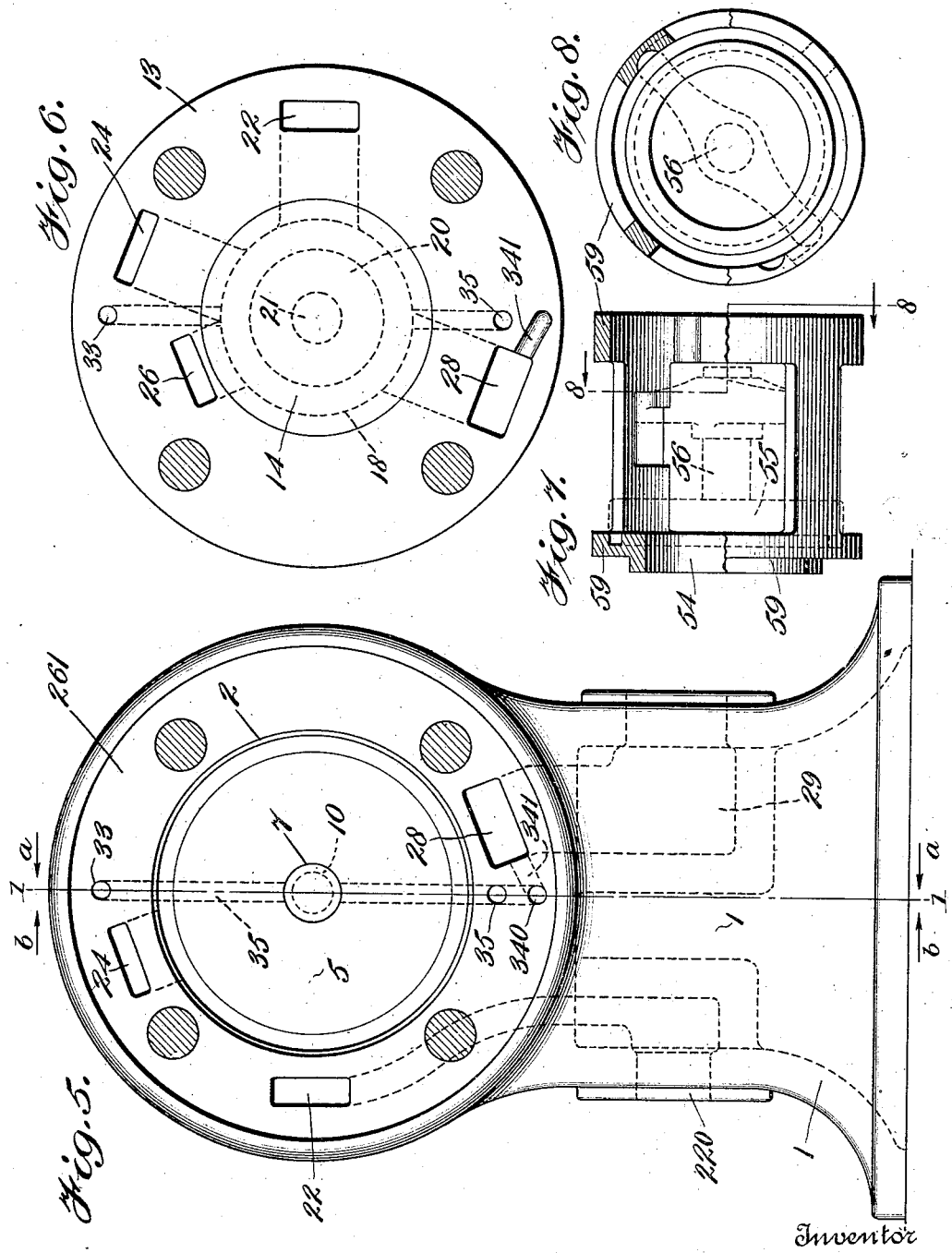

G. A. BOYDEN, Jr.
COMBINED ENGINE AND PUMP.
APPLICATION FILED FEB. 5, 1916.
1,250,423.
Patented Dec. 18, 1917.
4 SHEETS—SHEET 4.
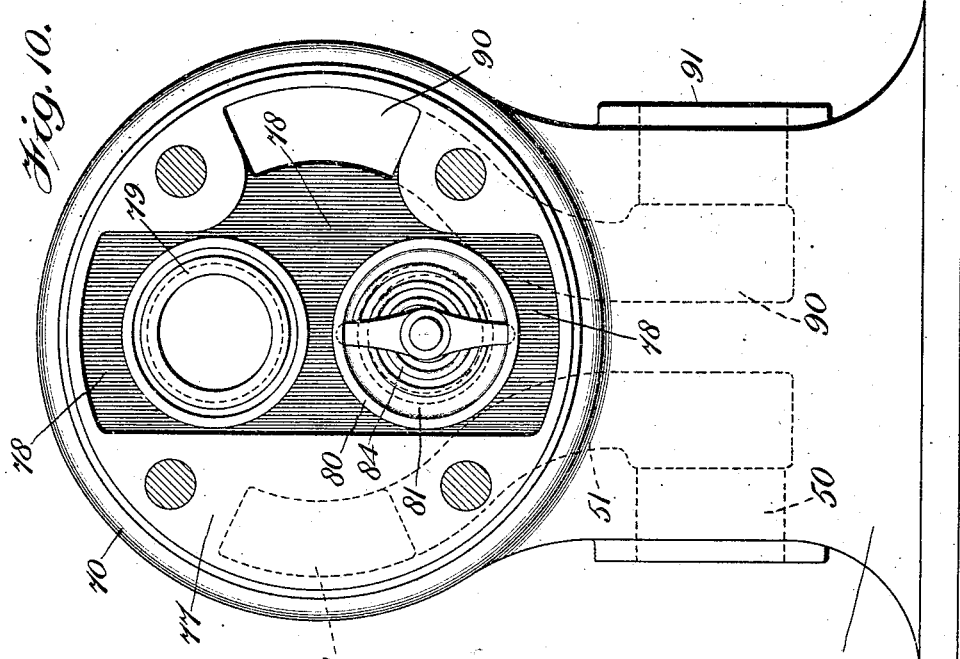
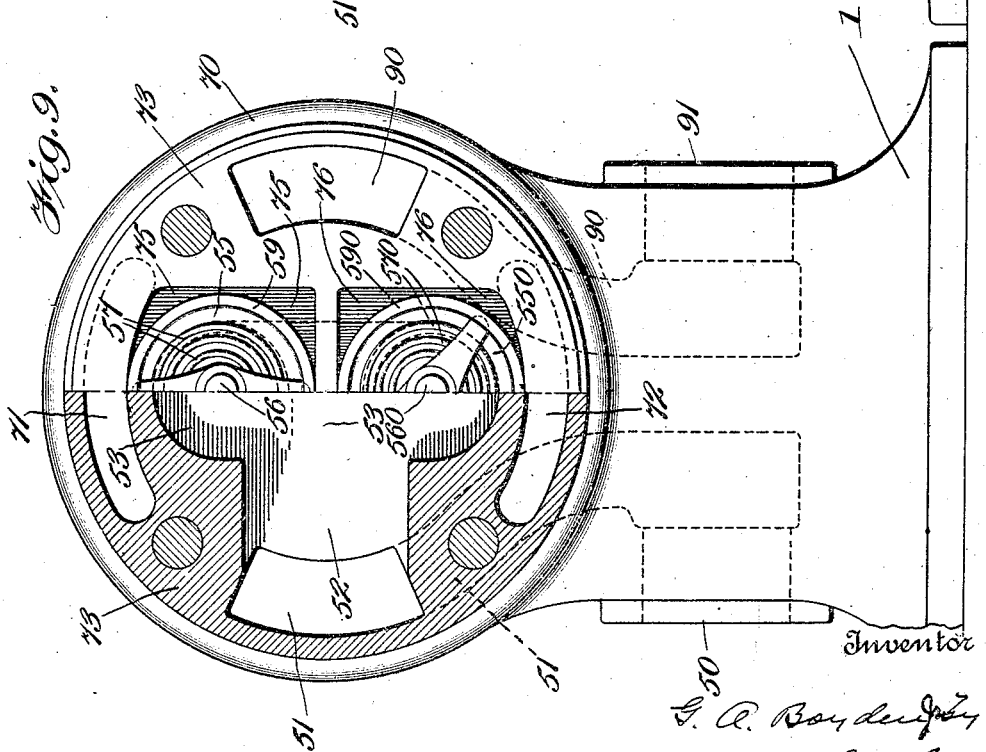
Inventor
G. A. Boyden Jr.
Attorney

UNITED STATES PATENT OFFICE.

GEORGE A. BOYDEN, JR., OF BALTIMORE, MARYLAND.

COMBINED ENGINE AND PUMP.

1,250,423.   Specification of Letters Patent.   Patented Dec. 18, 1917.

Application filed February 5, 1916. Serial No. 76,431.

*To all whom it may concern:*

Be it known that I, GEORGE A. BOYDEN, Jr., a citizen of the United States, residing at Baltimore and State of Maryland, have invented certain new and useful Improvements in Combined Engines and Pumps; and I do hereby declare the following to be a full, clear, and exact description of the invention, such as will enable others skilled in the art to which it appertains to make and use the same.

This invention relates to engines and motors, especially to a steam engine and pump, and has for its object to provide an apparatus of this character in which the pistons of the engine and motor will be connected in a manner more efficient than has been heretofore proposed, and also to provide an apparatus which will be simple in construction, comparatively inexpensive to manufacture, and more efficient in action than those which have been heretofore proposed.

With these and other objects in view the invention consists in the novel parts and combinations of parts constituting the apparatus, all as will be more fully hereinafter disclosed and particularly pointed out in the claims.

Referring to the accompanying drawings forming a part of this specification in which like numerals designate like parts in all the views—

Figure 1 is a longitudinal sectional view, taken on the line 1—1 looking in the direction of the arrows $a$, $a$ of Fig. 5, of an engine and pump made in accordance with this invention;

Fig. 2 is a view similar to Fig. 1 but seen from the opposite side of the apparatus or looking in the direction of the arrows $b$, $b$ of Fig. 5;

Fig. 3 is a view similar to Fig. 1, but showing the position of the parts after the pistons have completed a half cycle;

Fig. 4 is a view similar to Fig. 3, the parts being seen from the opposite side of the apparatus or looking in the direction of the arrows $b$, $b$ of Fig. 5;

Fig. 5 is an end elevational view partly in section of the parts as seen from the left in Fig. 1, the steam valve mechanism being removed along the line 5—5 of Fig. 3;

Fig. 6 is an end elevational view of the steam valve mechanism removed, the parts being seen from the right as shown in Fig. 3, and looking in the direction of the arrows $c$—$c$ of Fig. 3;

Fig. 7 is a partial sectional view of one of the water valve casings seen on the right of Fig. 3;

Fig. 8 is an end elevational view taken on the line 8, 8 of Fig. 7;

Fig. 9 is an end elevational view of the parts shown in Fig. 1 as seen from the right, the right hand portion of the water valve mechanism being removed, along the line 9, 9 of Fig. 1 and also a portion of the remaining parts being cut away along the line 9', 9' of Fig. 1, as illustrated in section, the parts being viewed in the direction of the arrows $d$, $d$ and $d'$, $d'$ of Fig. 1; and Fig. 10 is an end elevational view of the parts shown in Fig. 1, as seen from the right, the extreme right hand plate member being removed along the line 10, 10 of Fig. 1.

1 designates a suitable base, 2 a steam cylinder, 3 a water cylinder and 4 an integral connection between said steam and water cylinders. 5 designates a steam piston provided with suitable packing rings, 6, and connected by means of a piston rod 7 to the water piston 8 having the packing rings 9. The piston rod 7 is provided near the steam piston 5 with a circumferential groove 10 and about midway between the two pistons with a second circumferential groove 11 for a purpose more fully disclosed below. It is also provided with a plurality of circumferential packing grooves 12 preferably smaller than the grooves 10 and 11.

The integral connection 4, the cylinders 2 and 3, and the base 1 are all preferably cast in one piece as illustrated, and the said connection 4 is provided with a bore 400 which loosely fits the connecting rod 7 so that steam and water can with difficulty pass between the cylinders. In order to prevent the passage of fluids between the said cylinders the packing grooves 12 are provided, which may be suitably packed with either solid, semisolid or even liquid material, for the pressures of the fluids in the cylinders 2 and 3 will mutually oppose each other and therefore serve to automatically pack the space between the bore 400 and the outer surface of the piston rod 7, in a manner more fully disclosed below.

At one end 261 of the steam cylinder 2 and forming a cylinder head therefor is a steam valve casing 13 provided with a bushing 14 having an enlarged chamber 15 and a reduced chamber 16.

Within said enlarged chamber 15 is mounted a pair of pistons 17, 18 while within the reduced chamber 16 is a similar pair of pistons 19—20. The pistons 17, 18, 19 and 20 are suitably joined or connected together by a piston rod 21. 22 designates a passage for admitting steam from any suitable source 220 to the chamber 15 and through the port 23. 24 designates a passage leading from the chamber 16 through the port 25 to port 250 located in an enlargement of the bore in the end 262 of the steam cylinder 2, all as will be clear from the drawings.

26, (see Figs. 2, 4 and 6) indicates a passage provided with the port 260 leading from the chamber 15 and communicating with the end 261 of the steam cylinder 2. 27 designates a port in the chamber 15 communicating with a passage 28, connected with an exhaust passage 29 while 30 is a similar port located in the chamber 16 and connected to said passage 28 by a passage 31. 32 is a port leading from chamber 15 through the passages 33—34, 340—341 to the exhaust passage 29.

35 is a similar passage provided with the port 350 also leading from the chamber 15 and joined to the passage 33 as at 36. 37 is an auxiliary passage or port located near the port 250, leading from the passage 33 into the steam cylinder 2 for a purpose to be hereinafter described.

The parts being located and arranged substantially as illustrated and described, the operation so far as now disclosed will be as follows:—

Steam coming from the source 220 will pass along the steam passage 22 and enter the enlarged chamber 15 by way of the port 23. The said steam will thereupon enter the port 25 located in the reduced chamber 16, pass along the passage 24 to the port 250 and exert pressure upon the piston 5, tending to move the same toward the left, as seen in Fig. 1. Steam will further enter the port 350 in the enlarged chamber 15, pass along the passage 35 to the groove 10, pass through said groove around the piston rod 7, and enter at the point 36, the passage 33, whereupon it will pass along said passage to the port 32, and enter said chamber 15 on the left hand side as seen in Fig. 1 of the piston 17. The steam entering the port 23 will thus exert a pressure upon the piston 19 tending to move the same toward the right as seen in Fig. 1 and also a greater pressure upon the piston 18 tending to move the same toward the left as seen in said figure. This said greater pressure however will be balanced by the above named pressure toward the right that is exerted on the piston 17, so that the valve pistons 17, 18, 19 and 20 will remain stationary. In the meantime, the piston 5 will be moved toward the left, as seen in Fig. 1, owing to the pressure of the steam entering the port 250, and the piston rod 7 being likewise drawn toward the left the groove 10 will be moved out of register with the passage 35, and steam through said passage to the port 32 will be thereupon cut off. A quantity of steam however will be trapped in the extreme left hand end of the chamber 15, which trapped steam will maintain the valve piston 17 in its stationary position.

As the piston 5 continues to move toward the left the passage or port 37 will be uncovered whereupon steam entering the port 250 will pass from the cylinder 2 through said port 37 into the passage 33, and thus keep up or maintain the pressure on the piston 17 until the said piston 5 reaches the limit of its stroke toward the left, or until some other predetermined position has been reached, depending upon the location of the groove 11.

When said predetermined period in the stroke of the piston 5 has been reached, the groove 11, being properly located, will then register with the vertical passage 34, so that steam may exhaust through the port 32 along the passage 33, the passage 34, the passage 340, and the passage 341, into the exhaust passages 28 and 29 all as will be clear from Figs. 1, 2, 3, 4 and 6 of the drawings.

Pressure being relieved from the piston 17, the pressure between the pistons 18 and 19 due to the steam entering the port 23 will no longer be counterbalanced and the piston 18 will move rapidly toward the left thus causing the piston 19 to first close and then uncover the port 25, the parts taking up the positions shown in Figs. 3 and 4.

Steam now continues to enter the chamber 15 through the port 23, but the piston 18 having uncovered the port 260 (see Fig. 4) steam leaves the chamber 15 by way of the said port 260, enters the passage 26, and the cylinder 2 at the point 265, thus exerting a pressure on the piston 5 tending to move it to the right as seen in Fig. 1.

As the piston 5 begins to move toward the right, as seen in Fig. 1, or toward the left, as seen in Fig. 4, steam already in the said cylinder will begin to exhaust through the port 37 into the passage 33 into the passage 34, around the groove 11, into the passage 340, into the passage 341 and into the exhaust 28 and 29. As soon, however, as the piston rod 7 has moved a slight distance toward the left the groove 11 moves out of register with the passage 34 and the exhaust through the port 37 is thus cut off.

But a reference to Fig. 3 will make it clear that steam in the cylinder 2, can still exhaust through the port 250 into the pas- -sage 24, and through the port 25 into the chamber 16. A reference now to Fig. 4 will show that this steam may continuously exhaust from the chamber 16 through the port 30 and passage 31 into the exhaust passage 28, and into the exhaust 29, so that so long as the valve pistons 17, 18, 19 and 20 remain in the position shown in Figs. 3 and 4, steam may exhaust from the cylinder 2 until the piston 5 completes its stroke toward the right as seen in Fig. 1, or has completed its cycle.

Steam is exhausted from the other side of the piston 5 through the passage 26, port 260 in chamber 15, port 27, passage 28 and exhaust 29 all as will be clear from Figs. 2 and 6.

The above cycle of operations causing the piston 5 to reciprocate will be continued as long as steam is admitted into the passage 22. It will be obvious that when steam is admitted under pressure through the port 250 and the piston 5 is moving toward the left, as seen in Fig. 1, the live steam entering the cylinder 2 will tend to escape through the bore 400 around the piston rod 7 and into the cylinder 3. On the other hand, as will appear below, fluid at this moment will be under pressure in the cylinder 3 and it will likewise tend to escape around the piston rod 7 through the bore 400 into the cylinder 2. It therefore will result that when live steam is entering the port 250, the opposing pressures of the fluids in the cylinders 2 and 3 will mutually oppose each other and tend to pack the space around the piston rod 7 in the bore 400. On the other hand, when steam is being exhausted through the port 250, it will exert a much less pressure in the bore 400 and have a much less tendency to escape into the cylinder 2. In this particular period of the cycle fluid is being sucked into the cylinder 3 and, of course, it will likewise exert a much less pressure in the bore 400 than in the previous period of the cycle. Still there will be some tendency of the fluid in the cylinder 3 to enter the bore 400 and this tendency to leak around the piston rod 7 will be opposed by the exhaust pressure in the cylinder 2. It therefore follows that at all periods of the cycle the opposing pressures in the two cylinders 2 and 3 mutually act to pack the space around the piston rod 7 in the bore 400. In order to make this packing action effective the grooves 12 may be filled with any suitable material, and even if some steam does leak past said grooves 12 in the cylinder 3 no particular harm is done.

Coming now to the pump end of the apparatus in which 8 represents a pump piston rigid with the piston rod 7, and moving in the cylinder 3, 50 indicates a source of fluid supply, and 51 a passage leading from said supply to the port 52 (see Figs. 4 and 9) which port leads to the chamber 53 provided with the ports 54 and 540 controlled by the valves 55 and 550, provided with the stems 56 and 560 and which valves are normally closed by the springs 57 and 570 respectively.

The valve 55 is carried by a casing 59 and the valve 550 is carried by a casing 590, all as will be more fully disclosed below.

Fitting the end 70 of the cylinder 3, is a cylindrical member 73, provided with the passages 71 and 72, and also with the chamber 53 above disclosed. The said member 73 is also provided with pockets 75 and 76 into which the valve casings 59 and 590 respectively fit as will be clear from Fig. 9.

Fitting the outer end of the member 73 is a cylindrical ring like member 77 provided with a chamber 78, see Fig. 10, in which are located the valve casings 79 and 80 carrying respectively the valves 81 and 82 controlled respectively by the springs 83 and 84, and closing the extreme outer end of the member 77 is the plate 85, all as will be clear from the drawings.

The passage 71 in the member 73 registers with the passage 87 in the cylinder member 3 which connects with the port 88 entering said cylinder at one end thereof, and the passage 72 likewise joins the port 89 entering said cylinder at the other end thereof.

The operation of the pump mechanism so far as now disclosed is as follows: Supposing the parts to be in the position shown in Fig. 1, and supposing the piston 8 to be moving toward the left, as seen in said figure, fluid will be sucked from the chamber 53 into the passage 72 lifting the valve 550, until the piston 8 reaches the end of its stroke. When the piston 8 begins to move in the opposite direction fluid will be forced through the port 89, and passage 72 onto the opposite side of the valve 550, thus seating the same. Its pressure however will cause the valve 82 to lift against the compression of its spring 84 and thus force fluid into the chamber 78. From the chamber 78 (see Fig. 10) the fluid passes to the passage 90, and from the passage 90 to the conduit 91, see dotted lines Fig. 1.

As the piston 8 moves to the right, as seen in Fig. 1, in the manner above described, fluid will further be sucked from the chamber 53 past the valve 55, into the passage 71, passage 87 and passing through the port 88 it will follow the piston 8, so that as said piston again moves toward the left, as seen in Fig. 1, the said fluid will be forced out of the cylinder 3 through the port 88, passage 87, passage 71 onto the other side of the valve 55, thus seating the same, and its pressure will cause the valve 81 to lift, and the fluid to pass into the chamber 78, whence it passes into the passage 90 and conduit 91 as above disclosed.

This cycle of operations will be repeated as long as there is fluid supplied through the passage 51 and as long as the piston 8 reciprocates.

It will now be clear that by arranging the parts as above disclosed, the following important advantages result.

(a) That the cylinders 2 and 3, base 1, and connection 4, may all be cast in a single piece and easily machined into a finished article of manufacture ready for use.

(b) That the pistons 5 and 8 and connecting rod 7 offer no difficulty in their manufacture, and are easily assembled.

(c) That the valve holding member 13 and its associated parts, 14, 17, 18, 19 and 20 are likewise easily cast, machined, and assembled into their operative relations; and that they in themselves not only constitute a separate article of manufacture, but they are also capable, when needing repairs or replacement, of being readily taken off the cylinder 2 and a new set of similar parts easily substituted.

(d) That in a similar manner, the valve holding members 73 and 77, their contained valves and associated parts, likewise, are easily made, machined, assembled, brought to position on the cylinder 3, and removed therefrom for replacement or repairs; and that these said parts constitute a third article of manufacture which can be readily taken off the said cylinder 3 and a new set of similar parts substituted.

(e) That by making each of the above articles of manufacture of standard dimensions, I am enabled to readily, and in a minimum of time replace any member or members of the pump or engine so that a minimum delay is experienced in repairs.

(f) That there being none of the usual stuffing boxes to wear out, the troubles due to the same are eliminated, as well as the excessive friction accompanying said packing means.

(g) That the valves 17, 18, 19 and 20 being of the nature disclosed and positively actuated in both directions, the speed of the pump is easily regulated with certainty by the pressure of the steam.

(h) That owing to the fact that the space between the piston rod 7 and bore 400 may be made as small as desired capillary attraction will act to always maintain it full of fluid. Therefore, I am enabled to maintain a film of fluid at all times between said reciprocating piston rod 7 and said bore 400, thus obviating the necessity of supplying stuffing boxes, and avoiding the friction as well as the wear attendant upon their use.

(i) That owing to the avoidance of friction due to stuffing boxes, I am enabled to successfully employ a very high reciprocating speed in the pistons, and therefore, to successfully employ the particular type of valve mechanism illustrated which is especially adapted for high and variable speeds, and is not liable to get out of order or to require frequent repairs when in practice excessive and variable loads are put upon the pump; and (j) That owing to the very high speed at which the engine and pump may be normally run, the flow of fluid from the pump may be rendered unsually steady.

It is obvious that those skilled in the art may vary the details of construction as well as the arrangement of parts without departing from the spirit of the invention and therefore, I do not wish to be limited to the above disclosure except as may be required by the claims.

What I claim is:—

1. In an engine and pump the combination of a base member; a pair of open ended cylinders integral with said base member one of which is provided with a plurality of fluid passages extending across one end thereof; a connecting member integral with said base member and cylinders provided with a bore; a piston in each cylinder; and a piston rod controlling said passage rigid with each piston and fitting said bore fluid tight, substantially as described.

2. In an engine and pump the combination of a pair of cylinders one of which is provided with a pair of fluid passages extending across one end thereof and each of which is open at one end; a connecting member provided with a bore integral with and closing the other end of each cylinder; a piston in each cylinder; and a piston rod fitting said bore and provided with a pair of grooves adapted to control said passages, substantially as described.

3. A new article of manufacture consisting of a single casting and comprising a base member; a pair of cylinders open at one end provided with a plurality of transversely disposed fluid passages and adapted to receive pistons; and a member closing the other end of said cylinders provided with a bore connecting said cylinders and adapted to receive a piston rod, substantially as described.

4. A new article of manufacture consisting of a single casting and comprising a base member; a pair of open ended cylinders adapted to receive pistons and having a plurality of fluid passages in the bodies thereof extending across their axes; and a member integral with said cylinders, closing one end thereof and provided with a bore adapted to accommodate a piston rod leaving a capillary space between the surfaces of said bore and rod, substantially as described.

5. In an engine and pump the combination of an engine cylinder provided with a plurality of fluid passages extending transversely across one end thereof; a pump cylinder provided with a fluid passage extending lengthwise thereof; a member provided with a bore integral with and closing one end of each of said cylinders; a valve casing closing the other end of said engine cylinder; a second valve casing closing the other end of said pump cylinder; a piston in each cylinder; and a piston rod rigid with each piston adapted to reciprocate in said bore, substantially as described.

6. In an engine and pump the combination of a base; a pair of cylinders each provided with fluid passages and each open at one end and integral with said base; a connecting member provided with a bore integral with each cylinder and closing the other ends thereof; a piston in each cylinder; a piston rod fitting said bore and rigid with each piston; a casing member provided with passages registering with said first named passages closing the open end of each cylinder; and a valve mechanism in each casing member adapted to control said passages, substantially as described.

7. In an engine and pump the combination of a base; a pair of cylinders each provided with fluid passages and each open at one end and integral with said base; a connecting member provided with a bore integral with each cylinder and closing the other ends thereof; a piston in each cylinder; a piston rod provided with a groove fitting said bore and rigid with each piston; a casing member provided with passages registering with said first named passages closing the open end of each cylinder, said groove adapted to control one of said first named passages; and a valve mechanism in each casing member adapted to control said passages, substantially as described.

8. As an article of manufacture a valve holding member open at one end adapted to be readily attached to and detached from an open ended pump cylinder; said member provided with a plurality of ports and valves controlling said ports; a second valve holding member open at both ends provided with ports and controlling valves, associated with said first named member; and means for closing the outer end of said second member, substantially as described.

9. In an engine and pump the combination of a base; a pair of cylinders open at one end and with their axes coinciding integral with said base; a connecting member provided with a bore, the axis of which coincides with the axes of said cylinders; a piston in each cylinder; a piston rod fitting said bore rigid with each piston; each of said cylinders being provided with fluid passages; said piston rod provided with a groove adapted to control one of said passages; valve holding members adapted to close the open end of each cylinder provided with fluid passages to register with said first named passages; and a valve mechanism in each valve holding member adapted to control the passage of fluid through said passages, substantially as described.

In testimony whereof I affix my signature, in presence of two witnesses.

GEORGE A. BOYDEN, Jr.

Witnesses:
ROLAND H. BRADY,
MARIE G. KIMMELL.

Copies of this patent may be obtained for five cents each, by addressing the "Commissioner of Patents, Washington, D. C."